United States Patent
Tung et al.

(10) Patent No.: US 9,022,349 B2
(45) Date of Patent: May 5, 2015

(54) SOLENOID VALVE HAVING AIR TAP STRUCTURE

(75) Inventors: Cheng-Kai Tung, New Taipei (TW); Sheng-Min Yang, New Taipei (TW)

(73) Assignee: Koge Electronics Co., Ltd., Jhonghe (TW)

( * ) Notice: Subject to any disclaimer, the term of this patent is extended or adjusted under 35 U.S.C. 154(b) by 225 days.

(21) Appl. No.: 13/440,601

(22) Filed: Apr. 5, 2012

(65) Prior Publication Data

US 2013/0168584 A1    Jul. 4, 2013

(30) Foreign Application Priority Data

Dec. 29, 2011    (TW) .............................. 100149575 A

(51) Int. Cl.
| F16K 31/02 | (2006.01) |
| F16K 1/42 | (2006.01) |
| F16K 25/00 | (2006.01) |
| F16K 31/06 | (2006.01) |

(52) U.S. Cl.
CPC . F16K 1/42 (2013.01); F16K 25/00 (2013.01); F16K 31/0655 (2013.01)

(58) Field of Classification Search
CPC ............... F16K 1/42; F16K 1/44; F16K 7/14; F16K 25/00; F16K 31/06; F16K 31/0655
USPC ............... 251/129.15, 129.17, 333, 359, 366; 123/472
See application file for complete search history.

(56) References Cited

U.S. PATENT DOCUMENTS

| 4,719,943 | A | * | 1/1988 | Perach ...................... 137/625.65 |
| 5,758,864 | A | * | 6/1998 | Asai .......................... 251/129.17 |
| 6,006,728 | A | * | 12/1999 | Matsuda et al. ............... 123/472 |
| 6,089,538 | A | * | 7/2000 | Shirkhan ................... 251/129.17 |
| 6,394,415 | B1 | * | 5/2002 | Ohmi et al. ............... 251/129.16 |
| 7,594,516 | B2 | * | 9/2009 | Maisch et al. ................. 137/240 |
| 8,430,378 | B2 | * | 4/2013 | Hutchings et al. ........ 251/129.17 |

FOREIGN PATENT DOCUMENTS

| CN | 201116610 Y | 9/2008 |
| CN | 101672383 A | 3/2010 |
| CN | 201616356 U | 10/2010 |
| CN | 101907179 A | 12/2010 |
| CN | 201779280 U | 3/2011 |
| TW | 189564 | 8/1992 |
| TW | 249509 | 6/1995 |
| TW | 319343 | 11/1997 |
| TW | 526317 B | 4/2003 |
| TW | 200920976 A | 5/2009 |
| TW | I338101 | 3/2011 |
| TW | M415228 | 11/2011 |

* cited by examiner

Primary Examiner — Matthew W Jellett
(74) Attorney, Agent, or Firm — Moser Taboada

(57) ABSTRACT

A solenoid valve includes a plunger, an actuating device, and an air tap assembly. The plunger is connected to the actuating device. The air tap assembly is secured to the actuating device and has a cavity. The air tap assembly includes a main body, and first and second tubes. The first tube protrudes from the main body and defines a first through hole. The main body defines a second through hole communicated with the first through hole and the cavity. The second tube defines a third through hole. The main body defines a fourth through hole extended from the third through hole and a fifth through hole extended from the fourth through hole to the cavity. The fifth and second through holes are parallel. The plunger head is used to seal the second and fifth through holes.

8 Claims, 4 Drawing Sheets

SOLENOID VALVE HAVING AIR TAP STRUCTURE

RELATED APPLICATIONS

This application claims priority to Taiwan Application Serial Number 100149575, filed Dec. 29, 2011, which is herein incorporated by reference.

BACKGROUND

1. Field of Invention

The present invention relates to a solenoid valve. More particularly, the present invention relates to a solenoid valve having an air tap structure.

2. Description of Related Art

A typical solenoid valve having an air tap structure includes an air tap assembly, a housing, a coil rack, a core member, a plunger, a base, a spring, and two copper contacts. The solenoid valve having an air tap structure has a central tube in the top of the air tap assembly and a lateral tube in the lateral portion of the air tap assembly. Application of an electric current results in inducing a magnetic field such that the core member is attracted the base, thereby resulting in the core member moving downward. Hence, the plunger also moves downward and thus the openings of the central tube and the lateral tube are communicated with each other. When the electric current is turned off, the core member together with the plunger move upward as a result of the spring exerting an upward force on the core member, and as a consequence, the openings of the central tube and the lateral tube are no longer communicated with each other.

One disadvantage of such a configuration is that the plunger can deviate from the central axis of the solenoid valve because the plunger blocks laterally the opening of the lateral tube and the resulting lateral pressure directly contacts the plunger.

Therefore, there is a need to develop a solenoid valve having an air tap structure that is capable of avoiding the foregoing disadvantages.

SUMMARY

The present invention provides a solenoid valve having air tap structure.

In accordance with the present invention, the solenoid valve having an air tap structure includes a plunger, an actuating device, and an air tap assembly. The plunger has a connection member and a plunger head. The actuating device is coupled with the connection member of the plunger for moving the plunger. The air tap assembly is secured to the actuating device and has a cavity in which the plunger head is contained. The air tap assembly includes a main body; a first tube protruding from an outer surface of the main body and defining a first through hole that extends therethrough, the main body defining a second through hole communicated with the first through hole and with the cavity, the first and second through holes being located along a central axis of the main body; and a second tube protruding from the outer surface of the main body at an area thereof such that the second tube is not parallel with the first tube, the second tube defining a third through hole that extends therethrough, the main body defining a fourth through hole that is extended from the third through hole a distance and a fifth through hole that is extended from the fourth through hole to the cavity to thereby communicate the third through hole and the fourth through hole with the cavity, the fifth through hole being parallel to the second through hole.

According to another embodiment disclosed herein, the main body is formed with a circular opening on a bottom surface thereof. The circular opening surrounds the second through hole and communicates with the cavity and the fifth through hole.

According to another embodiment disclosed herein, a top surface of the plunger head is used to seal the opening of the second and fifth through holes, and the circular opening.

According to another embodiment disclosed herein, the actuating device includes a valve core, a spring, a seal sheet, a base, a coil rack, a housing, and two copper contacts. The valve core is connected to the plunger. The spring is located partly within the valve core. The seal sheet is disposed on the plunger and connected with a top of the valve core. The base is connected with a bottom of the valve core via the spring. The coil rack covers the valve core and the base and an outer part of the coil rack is surrounded with copper wires. The housing covers the outer part of the coil rack. A top of each of the copper contacts is connected with a bottom of the coil rack, and a bottom of each of the copper contacts is connected with a power supply unit for application of an electric current to the copper wires around the coil rack.

According to another embodiment disclosed herein, the seal sheet is a rubber seal sheet.

According to another embodiment disclosed herein, the coil rack is a non-magnetic coil rack.

According to another embodiment disclosed herein, an outer surface of a lower part of the connection member is formed with an external screw thread, and the valve core is formed with a hole and an internal screw thread in the hole. The valve core is coupled with the connection member through engagement between the screw threads.

According to another embodiment disclosed herein, the valve core is an iron valve core.

According to another embodiment disclosed herein, the valve core and the base are magnetically attracted to each other after a current is applied to the copper wires around the coil rack through the copper contacts.

According to another embodiment disclosed herein, the air tap assembly further includes a retention plate for fixing the actuating device.

According to another embodiment disclosed herein, the first tube is substantially vertical to the second tube.

According to another embodiment disclosed herein, the second through hole and the circular opening are located substantially on the same level, and an area of the top surface of the plunger head is greater than a surface area of the circular opening.

Thus, the solenoid valve having an air tap structure herein not only avoids a situation in which the plunger head of the plunger deviates from a central axis of the solenoid valve, but also lowers an elasticity needed for displacing the plunger so that it blocks the openings through use of a pathway and opening design of the tubes.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present invention provides a solenoid valve having an air tap structure that provides an enhanced configuration for tubes of the solenoid valve to thereby reduce lateral pressure and lower required elasticity.

Figure 1:
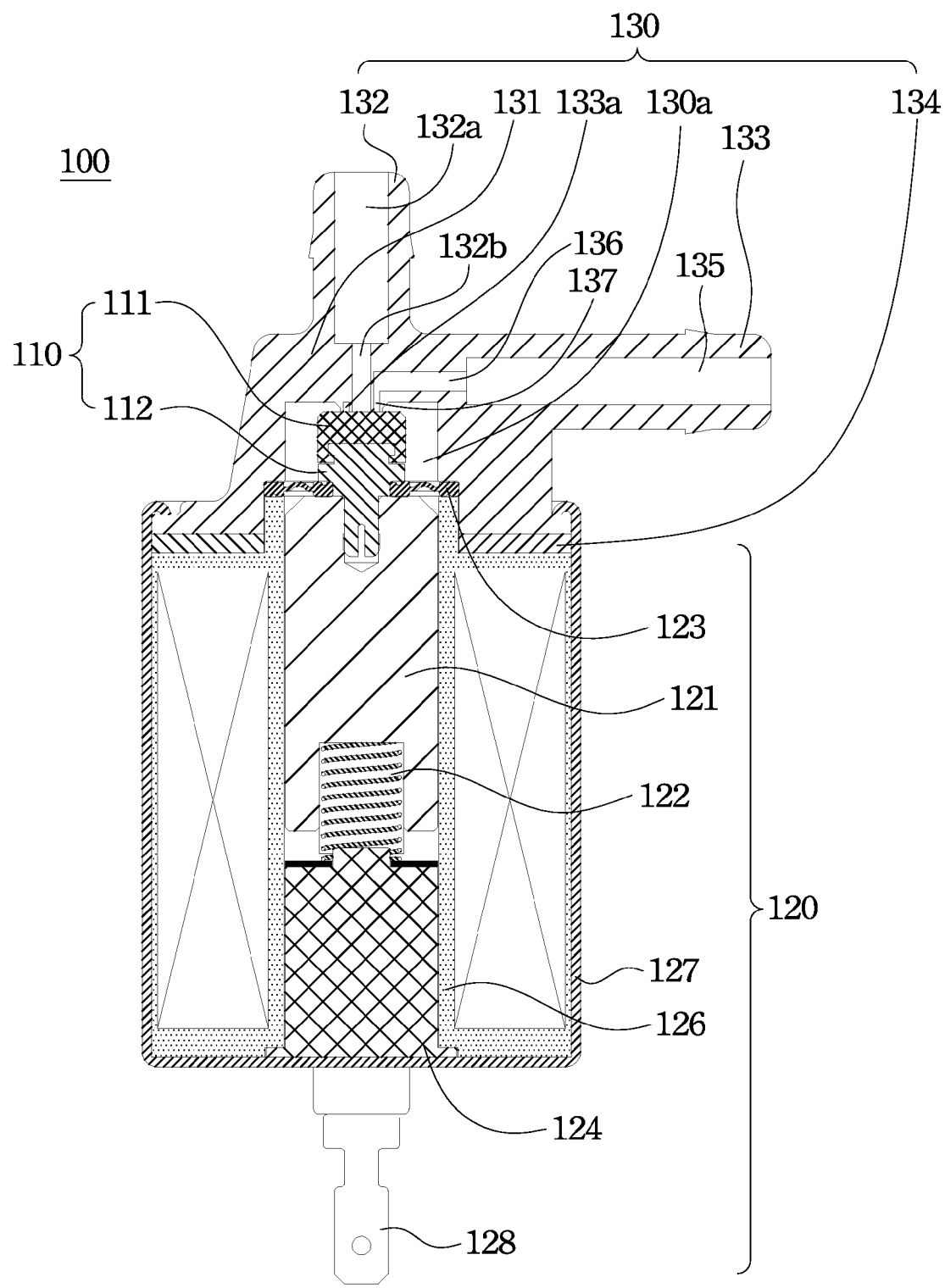
FIG. 1 illustrates a cross-sectional view of a solenoid valve having air tap structure according to an embodiment of the present invention.
Figure 1A:
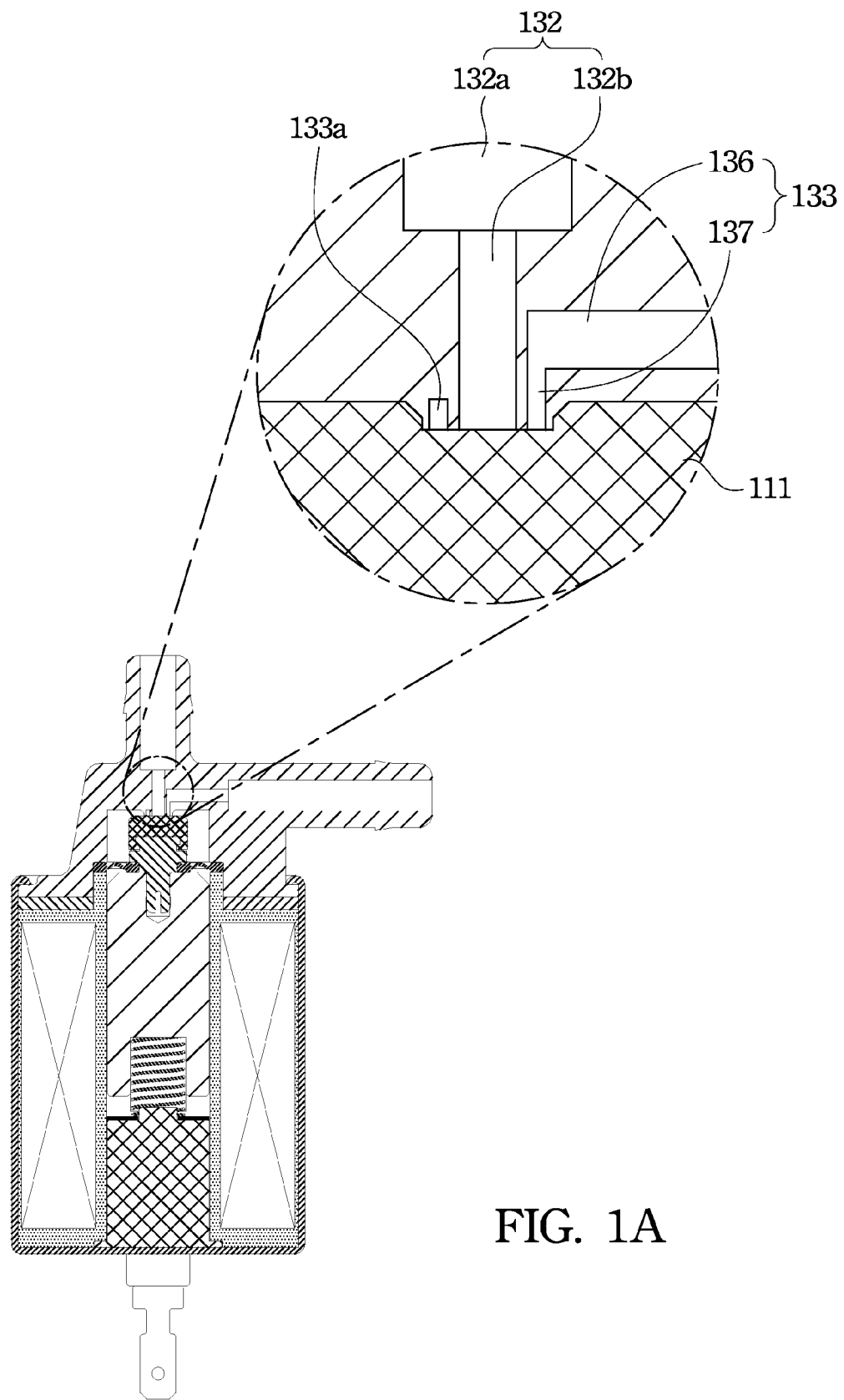
FIG. 1A is a view similar to FIG. 1, but illustrates a portion of the solenoid valve in a magnified state.
Figure 2:
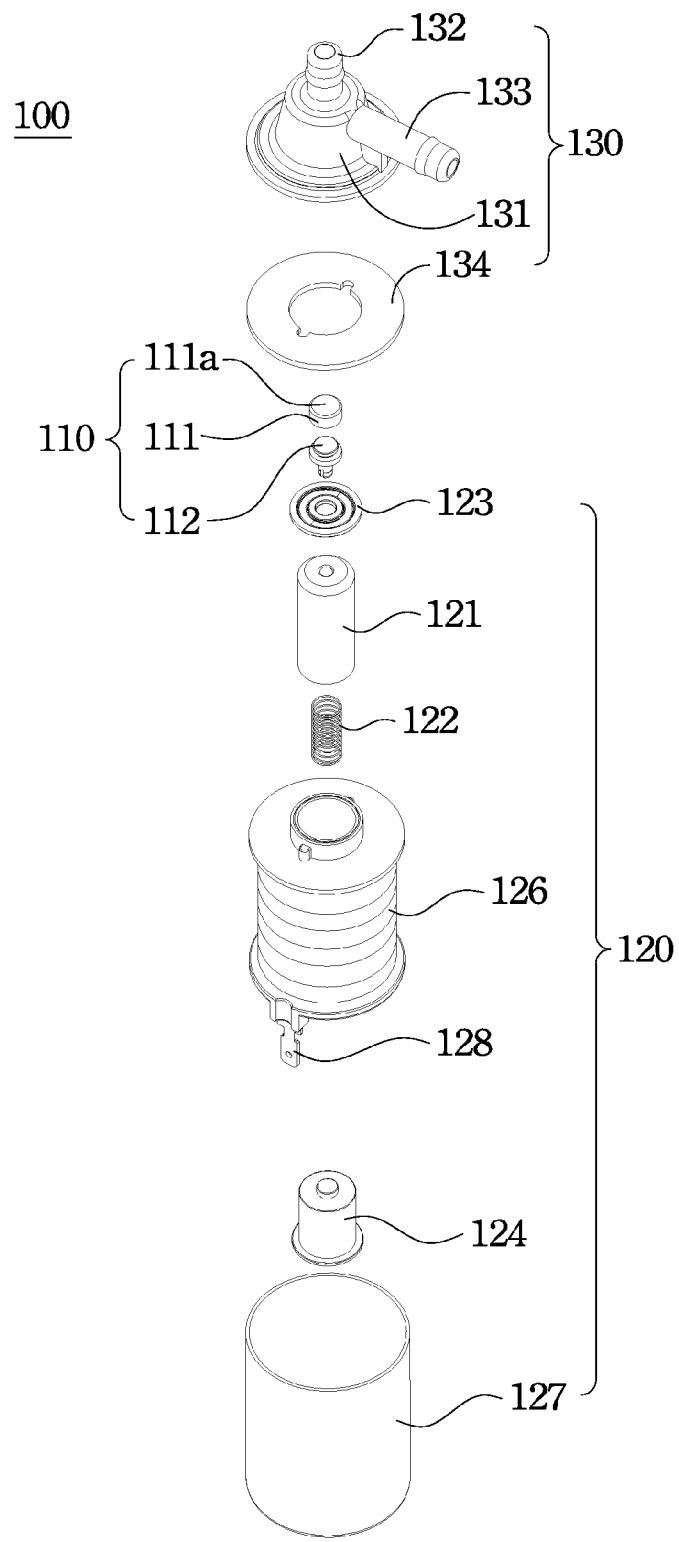
FIG. 2 illustrates an exploded view of the solenoid valve of FIG. 1.

FIG. 1 shows a cross-sectional view of a solenoid valve 100 having an air tap structure according to an embodiment of the present invention; FIG. 1A is a view similar to FIG. 1, but illustrates a portion of the solenoid valve 100 in a magnified state; and FIG. 2 shows an exploded view of the solenoid valve 100 of FIG. 1. As shown in FIG. 1, FIG. 1A, and FIG. 2, the solenoid valve 100 includes a plunger 110, an actuating device 120, and an air tap assembly 130.

The plunger 110 has a plunger head 111 and a connection member 112.

The actuating device 120 includes a valve core 121, a spring 122, a seal sheet 123, a base 124, a coil rack 126, a housing 127, and two copper contacts 128 (only one is shown in the drawings). The spring 122 is located partly within the valve core 121. In this embodiment, the valve core 121 is an iron valve core and is coupled with a lower part of the connection member 112. In some embodiments, an outer surface of the lower part of the connection member 112 is formed with an external screw thread, and the valve core 121 is formed with a hole and an internal screw thread in the hole, such that the valve core 121 can be securely coupled with the connection member 112 through engagement between the screw threads. The seal sheet 123 is located on the plunger 110 and is connected with a top of the valve core 121. In this embodiment, the seal sheet 123 is a rubber seal sheet. The seal sheet 123 is used to prevent air or liquid from reaching the valve core 121.

The base 124 is connected with a bottom of the valve core 121 via the spring 122, and the coil rack 126 covers the valve core 121 and the base 124. An outer part of the coil rack 126 is surrounded with copper wires. In this embodiment, the coil rack 126 is a non-magnetic coil rack.

The housing 127 covers the outer part of the coil rack 126 which is surrounded with copper wires. A top of each of the copper contacts 128 is connected with a bottom of the coil rack 126, and a bottom of each of the copper contacts 128 is connected with a power supply unit (not shown) for application of an electric current to the copper wires around the coil rack 126 to thereby induce a magnetic field. As a result, the valve core 121 is magnetized and thus the valve core 121 is attracted to the base 124.

The air tap assembly 130 is secured to the actuating device 120 and has a cavity 130a for containing the plunger head 111. The air tap assembly 130 includes a main body 131, a first tube 132, and a second tube 133. The air tap assembly 130 may further include a retention plate 134. The retention plate 134 is located between the base 131 and the coil rack 126 for ensuring that the air tap assembly 130 is securely connected to the actuating device 120.

The first tube 132 protrudes from an outer surface of the main body 131 and defines a first through hole 132a that extends therethrough. The main body 131 is formed with a second through hole 132b that is extended from the first through hole 132a to the cavity 130a to thereby communicate the first through hole 132a with the cavity 130a. In some embodiments, the first and second through holes 132a, 132b are aligned with a central axis of the main body 131. The second through hole 132b is smaller in diameter than the first through hole 132a.

The second tube 133 protrudes from the outer surface of the main body 131 at an area thereof such that the second tube 133 is not parallel with the first tube 132. In some embodiments, the second tube 133 is substantially perpendicular to the first tube 132. The second tube 133 defines a third through hole 135 that extends therethrough. The main body 131 is further formed with a fourth through hole 136 that is extended from the third through hole 135 a distance, and a fifth through hole 137 that is extended from the fourth through hole 136 to the cavity 130 to thereby communicate the third through hole 135 and the fourth through hole 136 with the cavity 130a. The fifth through hole 137 is smaller in diameter than the fourth through hole 136, and the fourth through hole 136 is smaller in diameter than the third through hole 135.

In some embodiments, the first and second through holes 132a, 132b are perpendicular to the third and fourth through holes 135, 136, and the fifth through hole 137 is parallel to the first and second through holes 132a, 132b, as shown in FIGS. 1 and 1A, and therefore perpendicular to the third and fourth through holes 135, 136.

In some embodiments, each of the first and second tubes 132, 133 defines a through hole that is uniform in diameter, communicates with a through hole formed in the main body 131, and has substantially the same diameter as the corresponding through hole in the main body 131. In some embodiments, the through hole of the first or second tube 132 or 133 and the corresponding through hole formed in the main body 131 gradually narrow in a direction toward the cavity 130a.

Figure 3:
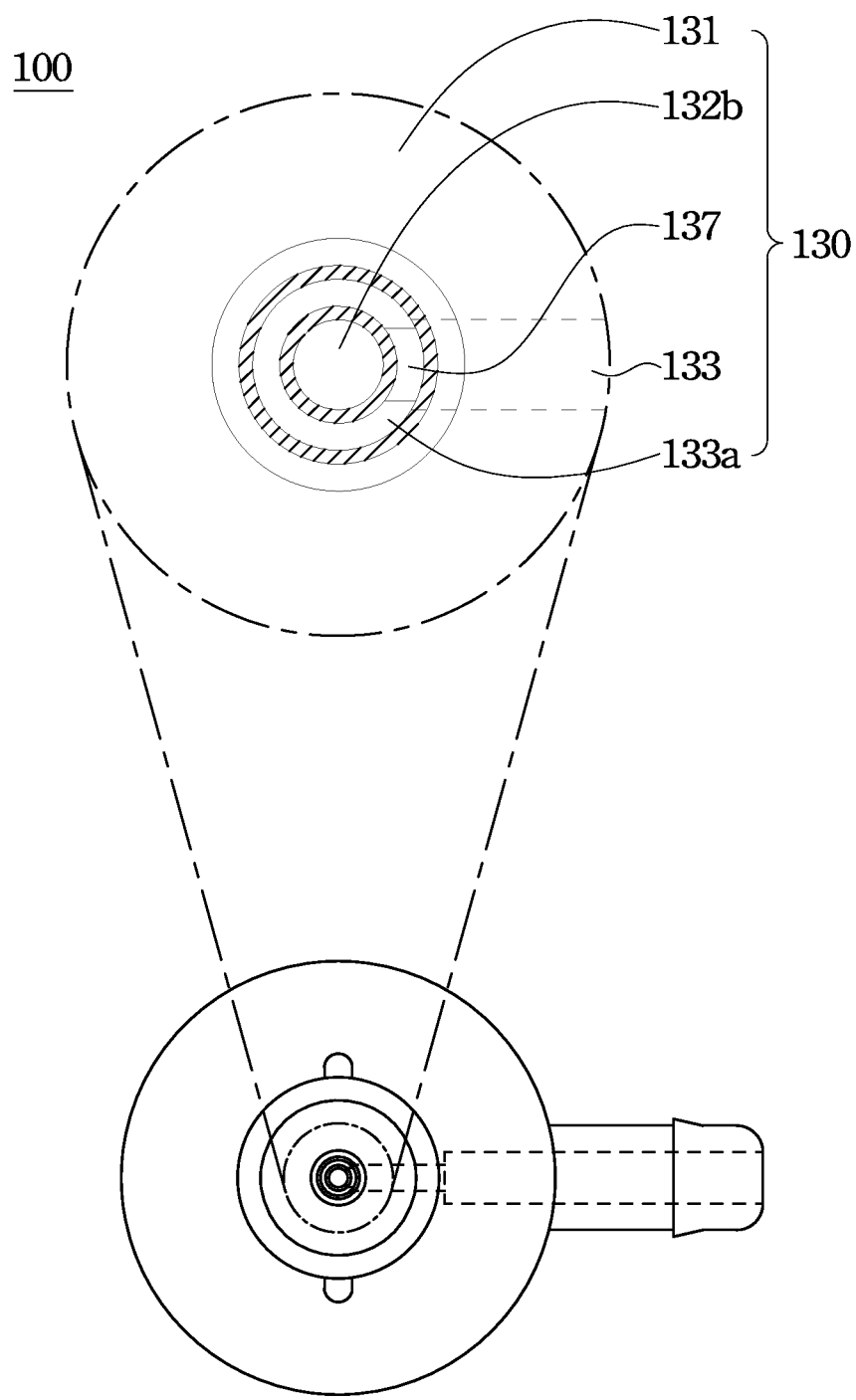
FIG. 3 illustrates a bottom view of the air tap assembly of the solenoid valve of FIG. 1.

With additional reference to FIG. 3, the fifth through hole 137 is communicated with a circular opening 133a near the cavity 130a. The circular opening 133a is formed in the main body 131 at a bottom surface of the main body 131, and surrounds the second through hole 132b and communicates with the cavity 130a. More details related to the circular opening 133a will be provided below.

A top surface 111a of the plunger head 111 is used to seal the first tube 132, the circular opening 133a, and the second tube 133 so as to prevent air or liquid from passing in and out of the first tube 132 or the second tube 133. In this embodiment, the second through hole 132b, which is communicated with the first through hole 132a defined by the first tube 132, and the circular opening 133a are located substantially on the same level, and an area of the top surface 111a is greater than a surface area of the circular opening 133a.

When the actuating device 120 is not activated, the valve core 121 is pushed by the spring 122 so that the top surface 111a of the plunger head 111 seals the first tube 132 and the circular opening 133a, as well as the second tube 133. Therefore, the solenoid valve 100 is in a closed condition and the first tube 132 and the second tube 133 are unable to transmit air or liquid to each other. When the actuating device 120 is activated, the power supply unit applies an electric current to the copper wires around the coil rack 126 through the copper contacts 128 to induce a magnetic field and thus magnetize the valve core 121 and the base 124. As a result, the valve core 121 is attracted to the base 124, the spring 122 is compressed and the plunger 111 is moved downward to open the first tube 132, the circular opening 133*a* and the second tube 133, such that the first tube 132 and the second tube 133 are communicated to each other. Thus, liquid or air can be transmitted between the first tube 132 and the second tube 133.

FIG. 3 illustrates a bottom view of the air tap assembly 130 of the solenoid valve 100 of FIG. 1. As shown in FIG. 1 and FIG. 3, the fifth through hole 137 is curved from the fourth through hole 136 and forms an opening with the circular opening 133*d*. The circular opening 133*a* is connected to the cavity 130*a* around an area surrounding the second through hole 132*b*. The second through hole 132*b* and the circular opening 133*d* are closed to a core of the main body 131. The top surface 111*a* of the plunger head 111 is used to block the first tube 132 (i.e., the second through hole 132*b*) and the circular opening 133*a* so as to prevent air or liquid from passing in and out of the first tube 132 or the circular opening 133*a*. The fifth through hole 137 communicates with the circular opening 133*a* such that pressure from the fifth through hole 137 is spread out to the circular opening 133*a* and thus prevents a centralized pressure and lowers a pressure of the unit area because the circular opening 133*a* has a bigger contact area than the fifth through hole 137.

According to the embodiments described above, the solenoid valve having an air tap structure of the present invention provides an enhanced configuration for the tubes to thereby reduce pressure on a lateral portion of the plunger and lower a required elasticity used to displace the plunger to block the first tube, the circular opening and the second tube. Such advantages are realized through a pathway and opening design of the first tube and the second tube.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A solenoid valve having an air tap structure comprising:
   a plunger having a connection member and a plunger head;
   an actuating device coupled with the connection member of the plunger for moving the plunger; and
   an air tap assembly secured to the actuating device comprising:
   a main body having a cavity;
   a first tube protruding from an outer surface of the main body and defining a first through hole that extends therethrough, the main body defining a second through hole communicated with the first through hole and with the cavity, the first and second through holes being located along a central axis of the main body;
   a second tube protruding from the outer surface of the main body at an area thereof such that the second tube is not parallel with the first tube, the second tube defining a third through hole that extends therethrough, the main body defining a fourth through hole that is extended from the third through hole a distance and a fifth through hole that is extended from the fourth through hole to the cavity to thereby communicate the third through hole and the fourth through hole with the cavity, the fifth through hole being parallel to the second through hole; and
   a retention plate located between the main body and the actuating device, wherein a portion of the main body is clamped between the retention plate and a portion of the actuating device, so as to ensure that the air tap assembly is securely connected to the actuating device, wherein the retention plate and the portion of the actuating device are located at a side of the second tube;
   wherein the main body is formed with a circular opening on a bottom surface thereof, the circular opening surrounding the second through hole and communicating with the cavity and the fifth through hole;
   wherein a top surface of the plunger head is used to seal the opening of the second and fifth through holes, and the circular opening; and
   wherein an end of the second through hole and an end of the circular opening that are connected to the cavity are located substantially on the same level above a bottom surface of the main body to form a raised circular lip, the circular opening defining an outer raised circular lip, the second through hole defining an inner raised circular lip circumscribed within the outer raised circular lip, and an area of the top surface of the plunger head is greater than a surface area of the circular opening.

2. The solenoid valve having an air tap structure of claim 1, wherein the actuating device comprises:
   a valve core connected to the plunger;
   a spring located partly within the valve core;
   a seal sheet disposed on the plunger and connected with a top of the valve core;
   a base connected with a bottom of the valve core via the spring;
   a coil rack covering the valve core and the base, an outer part of the coil rack being surrounded with copper wires;
   a housing covering the outer part of the coil rack; and
   two copper contacts, a top of each of the copper contacts being connected with a bottom of the coil rack, and a bottom of each of the copper contacts being connected with a power supply unit for application of an electric current to the copper wires around the coil rack.

3. The solenoid valve having an air tap structure of claim 2, wherein the seal sheet is a rubber seal sheet.

4. The solenoid valve having an air tap structure of claim 2, wherein the coil rack is a non-magnetic coil rack.

5. The solenoid valve having an air tap structure of claim 2, wherein an outer surface of a lower part of the connection member is formed with an external screw thread, and the valve core is formed with a hole and an internal screw thread in the hole, wherein the valve core is coupled with the connection member through engagement between the screw threads.

6. The solenoid valve having an air tap structure of claim 2, wherein the valve core is an iron valve core.

7. The solenoid valve having an air tap structure of claim 2, wherein the valve core and the base are magnetically attracted to each other after a current is applied to the copper wires around the coil rack through the copper contacts.

8. The solenoid valve having air tap structure of claim 1, wherein the first tube is substantially vertical to the second tube.

* * * * *